US007526286B1

(12) United States Patent
Allen, Jr. et al.

(10) Patent No.: US 7,526,286 B1
(45) Date of Patent: Apr. 28, 2009

(54) SYSTEM AND METHOD FOR CONTROLLING A COMPUTER VIA A MOBILE DEVICE

(75) Inventors: Lloyd W. Allen, Jr., Cary, NC (US); Steven Michael Miller, Cary, NC (US); Jana Helton Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/126,604

(22) Filed: May 23, 2008

(51) Int. Cl.
*H04M 3/00* (2006.01)
*H04M 1/66* (2006.01)

(52) U.S. Cl. .................................. 455/420; 455/411
(58) Field of Classification Search ................ 455/411, 455/420
See application file for complete search history.

(56) References Cited

U.S. PATENT DOCUMENTS

| | | |
|---|---|---|
| 5,367,667 A | 11/1994 | Wahlquist et al. |
| 5,909,183 A | 6/1999 | Borgstahl et al. |
| 6,128,484 A | 10/2000 | Singkornrat et al. |
| 6,425,000 B1 | 7/2002 | Carmello et al. |
| 6,636,831 B1 | 10/2003 | Profit, Jr. et al. |
| 6,868,292 B2 | 3/2005 | Ficco et al. |
| 7,277,726 B2 | 10/2007 | Ahya et al. |
| 2001/0049736 A1 | 12/2001 | Mannings et al. |
| 2002/0095294 A1 | 7/2002 | Korfin et al. |
| 2002/0144271 A1 | 10/2002 | Behagen et al. |
| 2003/0119485 A1* | 6/2003 | Ogasawara ............... 455/411 |
| 2003/0234809 A1 | 12/2003 | Parker et al. |
| 2006/0092041 A1 | 5/2006 | Leman et al. |
| 2006/0271404 A1 | 11/2006 | Brown |
| 2006/0276230 A1 | 12/2006 | McConnell |
| 2007/0005795 A1 | 1/2007 | Gonzalez |

OTHER PUBLICATIONS

Rao et al. "iMobile: A Proxy-Based Platform for Mobile Services" Proceedings of the first workshop on Wireless mobile internet. Rome, Italy. pp. 3-10. 2001.
Tarrini et al. "Remote Control of Home Automation Systems with Mobile Devices" Mobile HCI 2002, LNCS 2411, pp. 364-368, 2002. Copyright Springer-Verlag Berlin Heidelberg 2002.
Su et al. "Rajicon: Remote PC GUI Operations via Constricted Mobile Interfaces" MOBICOM'02, Sep. 23-26, 2002, Atlanta, Georgia, USA. Copyright 2002 ACM 1-58113-486-X/02/0009.

* cited by examiner

*Primary Examiner*—Nick Corsaro
*Assistant Examiner*—Michael Mapa
(74) *Attorney, Agent, or Firm*—Locke Lord Bissell & Liddell, LLP; Pedro A. Rojas

(57) ABSTRACT

A system and method for remotely controlling a computer using voice commands via a mobile device are disclosed. Remotely controlling a computer via a mobile device, comprises at least: receiving a voice command via the mobile device; comparing the received voice command to validated audio commands associated with script commands specific to a predetermined operating system, wherein the comparing step identifies a script command associated with a validated audio command based on the received voice command; transmitting the identified script command and verification data from the mobile device to the remote computer wherein the remote computer: uploads the transmitted script command upon verification that the mobile device is authorized to control the remote computer; processes the uploaded script command in accordance with said predetermined operating system; and sends, to the mobile device, a visual or acoustic signal indicative of a status of processing the uploaded script command.

1 Claim, 2 Drawing Sheets

US 7,526,286 B1

SYSTEM AND METHOD FOR CONTROLLING A COMPUTER VIA A MOBILE DEVICE

FIELD

The disclosure relates to communications systems in general, and more particularly to a system and method for remotely controlling a computer using voice commands via a mobile device.

BACKGROUND

The current business marketplace has expanded globally. As a result, computer users have a continuous need to seamlessly access computing resources from anywhere at anytime. A number of applications currently exist to allow users to easily access and control a computer remotely via the Internet. For example, known methods for providing secure remote access to computing resources are PcAnywhere™, GoToMyPC™, PCNow™, and the like. These and other known methods for remotely accessing computer resources require dedicated network connection between a remote computer and a host computer, as well as, a graphical user interface (e.g., a web-browser) in at least one of the remote computer and host computer. Accordingly, there is a need for an alternate method for remotely accessing computing resources that can offer more flexibility and mobility.

In response the above, some have proposed the creation of a wireless "virtual office" for "mobile" users, by taking advantage of the proliferation of cellular telephony, wireless Internet-enabled devices, personal digital assistants (PDAs), handheld PCs, and the like. Regrettably, even with the latest developments in mobile devices, users often find themselves unable to access information while away from their home or office. For example, current wireless network access is generally slow and unpredictable. Wireless Internet access of full-featured sites typically requires data transfers in the order of hundreds of megabytes (MB), while internet-enabled wireless devices can only handle several kilobytes/second. In addition, even when able to access remote computing resources via modern mobile devices, users are inconveniently restricted to performing such access through very small-sized graphical interfaces. Due to the small screen of a mobile device, for example, only a limited amount of data can be viewed at one time. For example, a typical PC's desktop resolution might be 1024×728, whereas a typical resolution of a mobile device might be 120×130.

It would be advantageous to enable mobile professionals to access computing resources from virtually any location, such as from a wireless mobile device capable of operating over unreliable wireless networks without the need of performing such access through complicated and small-sized graphical interfaces.

Using speech technology as part of the everyday personal and business operations can help accomplish computing tasks easily and quickly. Today, the current mobile computing marketplace has increasingly focused on integrating speech-enabled applications into mobile computing devices. One example of such an application is the hands-free dialing functions of cellular phone readily available in today's marketplace. Nevertheless, due to the limited processing power of such mobile devices and the unreliability of wireless networks, the possibility of providing a method for comfortably and quickly accessing remote computing resources via a mobile device remains unsolved.

SUMMARY

The following examples provide a system and a method for remotely controlling a computer using voice commands via a mobile device. Exemplary embodiments of this disclosure would advantageously enable a user to enter and compile, in a mobile device such as a cellular phone, a plurality of computer executable script commands specific to a predetermined operating system, enable by using voice commands. Upon voice commands are recognized as valid instructions, the mobile device transmits the compiled script commands to a remote computer, where the computer uploads and processes, the received script commands. Upon processing the script commands, the computer sends a signal indicative of an status of the process to the mobile device.

In accordance with at least one disclosed example, a method for remotely controlling a computer using voice commands via a mobile device comprises: generating a plurality of predetermined computer executable script commands for controlling a remote computer wherein each script command is specific to a predetermined operating system; storing the plurality of script commands on a mobile device; associating an audio command with each script command and storing the associations on the mobile device; receiving a voice command via the mobile device; comparing the received voice command with the audio commands associated with the script commands, wherein the comparing step is performed at the mobile device and wherein the comparing step identifies the script command associated with the audio command based on the received voice command; transmitting the identified script command and verification data from the mobile device to the remote computer wherein the remote computer: uploads the transmitted script command upon verification that the mobile device is authorized to control the remote computer; processes the uploaded script command in accordance with said predetermined operating system; and sends, to the mobile device, a visual or acoustic signal indicative of a status of processing the uploaded script command.

DETAILED DESCRIPTION

In the following description of the various examples, reference is made to the accompanying drawings which are illustrations of various embodiments in which the system and method may be practiced. It is to be understood, however, that those skilled in the art may develop other structural and functional modifications without departing from the scope of the instant disclosure.

Figure 1:
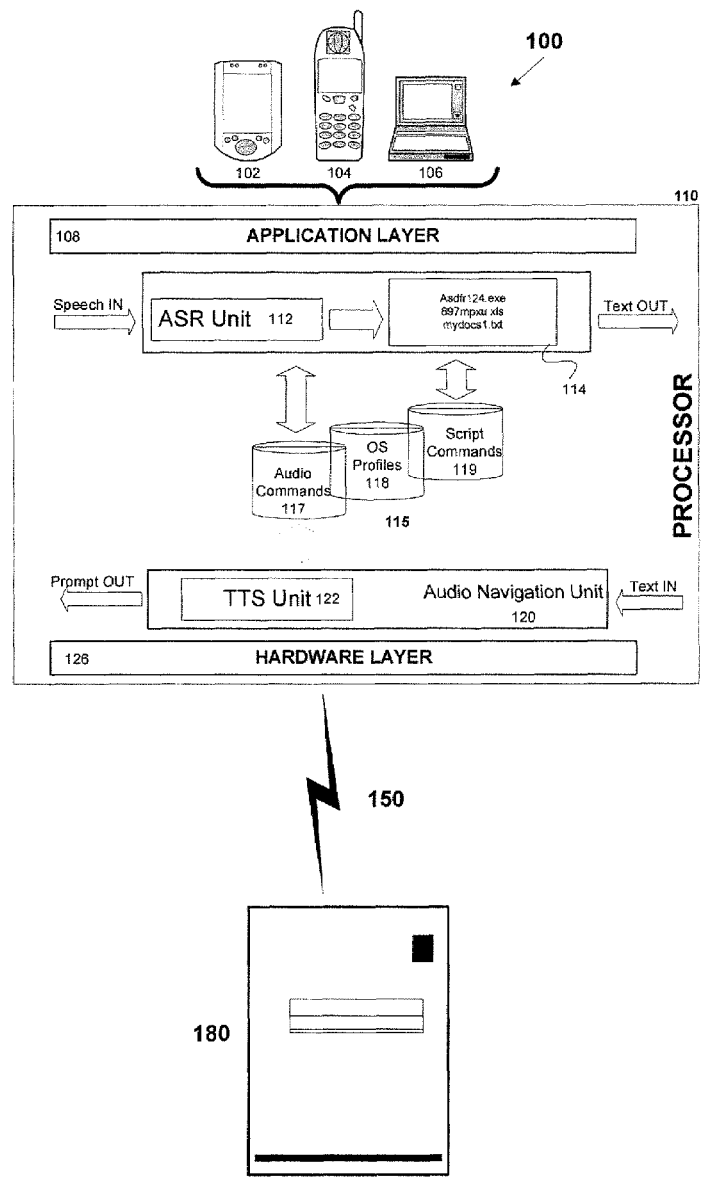
FIG. 1 is a schematic diagram of an exemplary mobile device configured to remotely control a computer.

Referring to the drawings, wherein like reference numerals refer to like parts, FIG. 1 is a block diagram illustrating an exemplary mobile device configured to remotely control a computer via voice commands. As shown in FIG. 1, a mobile device 100, which may be a personal digital assistant (PDA) 102, a hand-held wireless telephone 104, a laptop computer 106 or the like, communicates with a computer 180 over a network connection 150 to remotely control computer 180, as will be discussed in detail hereinafter. The computer 180 may be a single entity, such as a single personal computer or a network server, or an entity representing a plurality of computers, servers, or server applications.

The network connection 250 may be formed as a wired or wireless network. For example, network connection 250 may be a digital wireless wide area network (WAN), based on architectures such as Global System for Mobile Communications (GSM), IS-136 TDMA-based Digital Advanced Mobile Phone Services (DAMPS), Personal Digital Cellular (PDC), IS-95 CDMA-based "cdmaOne" System, General Packet Radio Service (GPRS) and broadband wireless architectures such as WCDMA and Broadband GPRS. Other alternatives include a wireless LAN (e.g., IEEE 50.11), a wireless personal area network (e.g., Bluetooth or IrDA), or the like. As may also be appreciated, therefore, any means for remotely establishing communication between mobile device 100 and computer 180 is equally consistent with the examples disclosed herein.

As shown in FIG. 1, mobile device 100 includes at least one processor unit 110 configured to receive input through an application layer 108 and operate mobile device 100 through hardware layer 126. In an exemplary embodiment, processor unit 110 is configured to operate mobile device 100 to receive a voice command from a user (Speech IN), recognize the voice command as a validated audio command at an Automatic Speech Recognition (ASR) unit 112, convert the validated audio command into a computer-executable script command 114, and transmit the script command (Text OUT) to computer 180 via network connection 150. In the event where the received voice command is not recognized as a validated audio command, an Audio Navigation Unit 120 through a text-to-speech (TTS) unit 122 may prompt the user (Prompt OUT) to provide a new command.

Audio navigation unit 120 and TTS unit 122 may be implemented in hardware, software or a combination thereof, and may be an integral or peripheral part of ASR unit 112. In the event where it is determined that a user has entered an invalid voice command, processor unit 110 instructs audio navigation unit 120 to query the user (Prompt OUT) to repeat the command or enter a new one. Alternatively, audio navigation unit 120 may instruct the user to enter a valid command via other input units, such as, e.g., a keypad, touch screen, and the like.

Voice command recognition, as well as audio prompt execution, may also be accomplished through software, hardware or a combination of those. Typical commercially available voice recognition software (VRS) packages, also known as speech-recognition, automatic speech recognition, ASR or natural language recognition software packages, are provided with a vocabulary of likely words or phrases that are matched against acoustic voice data received from a user to generate a text of recognized words, for purposes of a given application. In addition, voice recognition software packages often echo to the user a transcription of the closest match to what the user has said, thereby giving the user an opportunity to confirm or reject an entry. Examples of commercially available VRS packages are ViaVoice™ distributed by IBM Corporation, iListen™ developed by MacSpeech Inc., NaturallySpeaking™ developed Dragon Systems Inc. and sold by Nuance Communications, or the like.

In an exemplary embodiment in accordance with FIG. 1, mobile device 100 further comprises storage units 115 which may store a plurality of computer executable script commands 119 for controlling remote computer 180, wherein each script command is specific to a predetermined operating system (OS) profile 118. In addition, mobile device 100 may be provided with a list of validated audio commands 117 which may comprise words or phrases in association with corresponding computer executable script commands 119 which are also specific to predetermined OS profile 118. That is, the words or phrases residing in the list of validated audio commands 117 may be associated with script commands 119 that are specific to a predetermined operating system profile 118 and/or a predetermined application corresponding to a given computer 180 which a user intends to remotely control.

A predetermined list of validated audio commands 117 associated with a plurality of computer executable script commands 119 specific to OS profiles 118 may be downloaded from a telephone service provider, a software vendor, or even an independent website for each type of operating system. Alternatively, or in addition thereto, a predetermined list of validated audio commands 117 associated with a plurality of script commands 119 may be provided by a manufacturer of mobile devices by securely storing said commands in a protected memory of mobile device 100. In another exemplary alternative, validated audio commands 117 associated with script commands 119 specific to an OS profile 118 may be distributed on a portable storage unit, such as, e.g., a flash drive memory which may plugged into mobile device 100 at the user's discretion. Other alternatives of providing a list of validated audio commands and script commands will be apparent to those skilled in the art and may include additional delivery methods currently known in the art or that may become available in the future. It should also be apparent, however, to those skilled in the art that each of the list of validated audio commands 117 and the plurality of computer executable script commands 119 may be obtained separately from a different provider.

Once mobile device 100 has been configured with the elements necessary to remotely control a computer by way of spoken commands, as described supra, processor unit 110, upon receiving a user's voice command may extract a corresponding script command 114 from script commands 119 and transmit the extracted script command 114 via network connection 150 to remote computer 180 for processing.

Figure 2:
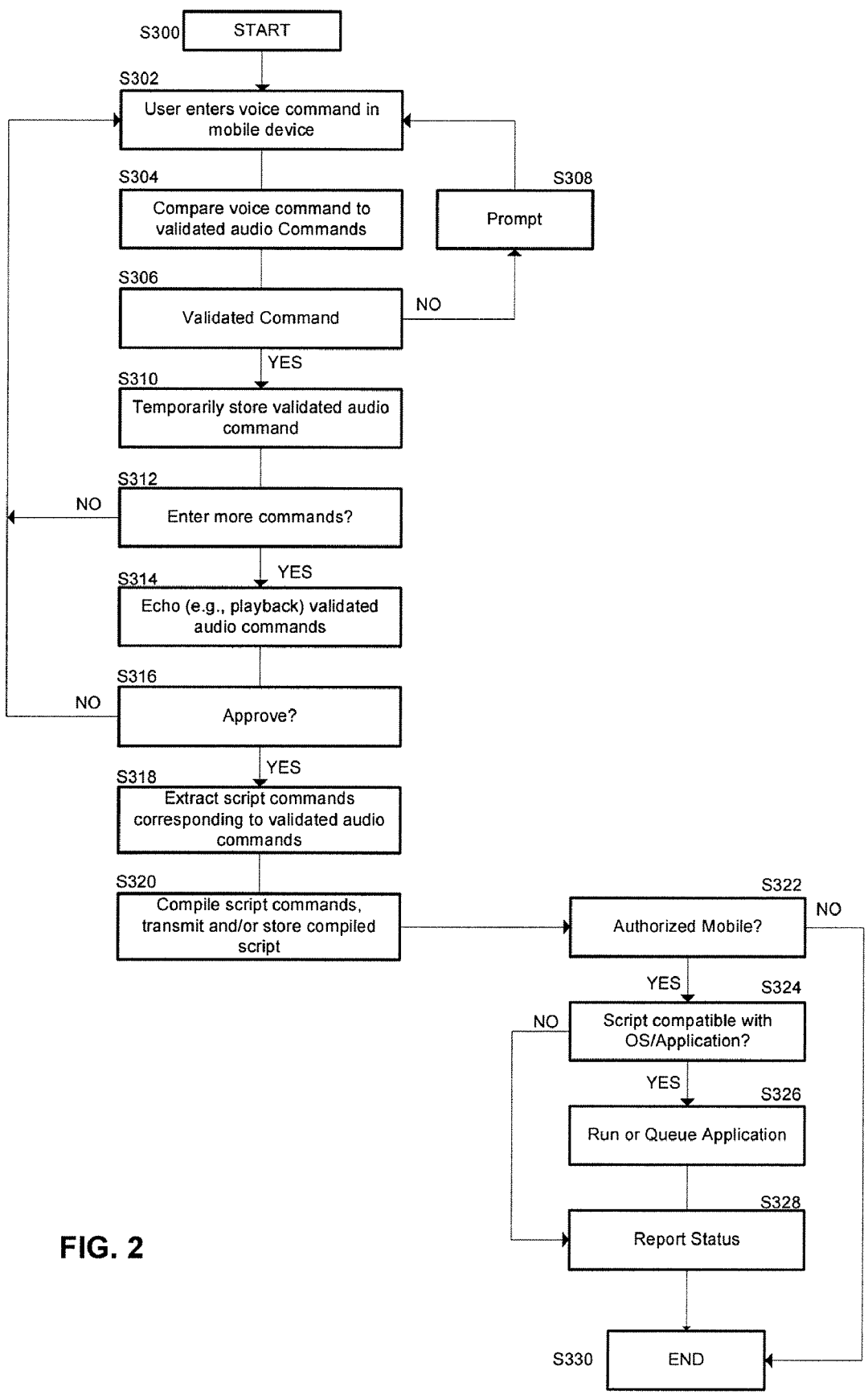
FIG. 2 is a schematic flowchart of exemplary interactions between a mobile device and a remote computer.

FIG. 2 is a flowchart illustrating an exemplary process by which a user of a mobile device 100 may access and run computing resources located in a remote computer 180.

An exemplary process of remotely controlling a computer 180 using voice commands (Speech IN of FIG. 1) via mobile device 10 is now described in connection with FIG. 2. As shown in FIG. 2, the processes starts at S300 when a user begins a dialog with mobile device 100. At S302, a voice command is received at mobile device 100 via input interfaces (e.g., microphone, or the like) readily available in current mobile devices. At step 304, the received audio command (Speech IN of FIG. 1) is parsed and compared with a list of validated audio commands 117. At step 306, if the received voice command is recognized as a validated audio command (e.g., the received voice command matches a validated audio command), the process advances to step S310. Any natural language parser and/or ASR software package may be used to determine if the received voice command matches a validated audio command.

At step S310, the validated audio command is temporarily stored. Alternatively, if at step S306 the received voice command is not recognized, the process branches to step S308. At step S308, mobile device 100 through audio navigation unit 120 prompts the user to repeat the voice command or to enter a new command, whereby the process returns to step S302. At step S312, mobile device 100 may prompt the user as to whether or not more commands are to be entered. In the event of a positive response (YES at step S312), the process returns to step S302. Once all of the desired commands have been entered by the user, at step S314, mobile device 100 outputs (echoes) the stored audio commands for user approval. At step S316, the user makes a decision as to whether or not the validated audio commands represent his/her intended operation. In the event that the user does not approve at step S316, the process returns to step S302.

Alternatively, if at step S316 the validated audio commands are approved by the user, the process advances to step S318. At step S318, processor unit 110 extracts from the list of script commands 119 at least one script command corresponding with the validated audio commands that have been recognized as valid at the comparing step S304. The extracted command scripts are now compiled as a single script or multiple script commands 114 and stored in mobile device 100 for future use, or transmitted (step S320) to computer 180 via connection 150. The compiled script may be transmitted from mobile device 100 to computer 180, by first establishing a direct connection therebetween or by relaying the compiled message. Main frame operators, for example, would usually call an IP address/telephone, whereby a compiled script representing a batch job, a job control language command, or the line may be uploaded. Alternatively, or in addition thereto, a mobile user who suddenly desires to access an old photograph in his home computer, may compile a script command in the manner describe supra, transmit the scrip command to computer 180 in the form of a plain text message.

At step S322, computer 180 verifies whether or not mobile device 100 is authorized to upload the compiled script. In the event that computer 180 determines that mobile device 100 is not authorized to upload the compiled script (NO at S322), the process ends at step S328. Otherwise, in the event that computer 180 verifies that mobile device 100 is authorized to upload the compiled script, the transmitted script is uploaded to computer 180 and the process advances to step S324. It is to be appreciated by those skilled in the art that the process of verification may be performed in a variety of methods, such as, e.g., using a private/public key pair in mobile device 100 and computer 180, respectively. Alternatively, or in addition thereto, mobile device 100 may be verified as authorized to access computer 180 by requiring that the user of mobile device 100 provide a password and/or any biometrical information.

At step S324, the computer 180 determines whether the uploaded script is compatible with its operating system and/or with the application for which the script has been compiled. In the event that the uploaded script is not compatible with the local OS and/or destination application, computer 180 may send a notice to that regard by advancing the process directly to step S328. Otherwise, when computer 180 determines that the uploaded script is compatible, the process advances to step S326. At step S326, computer 180 determines whether the uploaded script should be immediately processed or queued for later processing. At step 328, upon queuing and/or processing the script, computer 180 may send to mobile device 100 a visual or acoustic signal (e.g., Text IN of FIG. 1) indicative of a status of processing the uploaded script. Subsequently, the process ends at step S330.

The system and method for remotely controlling a computer using voice commands via a mobile device, as describe supra, may be used in the following hypothetical examples. Assume, for example, that a user has sent from mobile device 100 a compiled script command 114 to computer 180, such as, e.g., a mainframe computer to run a "batch file." As it is known to the skilled artisan, computers are capable of continuously monitoring an "in box." In the present example, a computer program may run continuously, monitoring predetermined directories and/or queues for a new script command. When script command 114 appears, computer 180 first determines if script command 114 is compatible with the local operating system. Alternatively, or in addition thereto, computer 180 may determine whether or not script command 114 has been properly compiled for a predetermined application. In the event where computer 180 encounters compatibility and/or compilation errors in the uploaded script command 114, computer 180 may send a signal to mobile device 100 indicating, for example, "the batch file submitted at 15:12:17 on Jun. 12, 2008, is not compatible with IBM MVS/ESA operating system, please provide a new script command." Otherwise, if computer 180 determines that script command 114 is compatible with the local OS and/or the desired application, a decision is made as to whether or not script command 114 should be immediately processed or queued for later processing. Upon processing the received script command 114, computer 180 may send a message to mobile device 100 indicating, for example, "batch file submitted at 15:12:17 on Jun. 12, 2008, successfully finished," or the like.

Another exemplary scenario, may take place in a situation where a user has left his/her office for a long vacation, but has forgotten to setup his/her "out of office" email responding rule. In this scenario, a user may input a series of voice commands and compile a script command at his/her mobile device, as described supra in connection with the process of FIG. 2. Upon compiling the script of commands, the user may send the compiled script to his/her office computer, for example, by using a network connection, such as, e.g., by establishing a virtual private network (VPN) link between the mobile device and the office computer. Alternatively, the user may send the compiled script command to his/her computer, by sending a text message from the mobile device to the office computer. Upon receiving the compiled script command, the computer would upload the compiled script command for processing, and thereafter the office computer would send a signal indicative of the status of processing the uploaded script.

As can be appreciated from the foregoing, the present invention may advantageously enable a user to remotely control a computer using voice commands via a mobile device. In addition, it will apparent to those skilled in the art that any number of mobile devices 100 may be connected through any variety of connections 150 to remote computer 180.

Thus, a system and method for remotely controlling a computer using voice commands via a mobile device has been disclosed. The meritorious effects of the present disclosure are summarized as follows.

The system and method according to the present disclosure enables users to efficiently access remote computing resources without depending on slow and unreliable networks, and/or mobile devices with limited-size graphical interfaces and limited processing power. For example, given the abundance of mobile devices, such as, e.g., the so called "smart" cellular phones or the like, this system and method would be particularly useful for mobile professionals in need for a mobile and flexible manner to remotely access their home or office computing resources. The reason is that using speech technology as part of the everyday personal and business operations can help accomplish computing tasks easily and quickly in a more efficient and natural manner.

What is claimed is:

1. A method for remotely controlling a computer via a mobile device, comprising:
generating a plurality of predetermined computer executable script commands for controlling a remote computer wherein the script commands are specific to a predetermined operating system of the remote computer;
storing the plurality of script commands in a mobile device;

associating a plurality of validated audio commands with the script commands and storing the associations in the mobile device;

receiving a voice command via the mobile device;

comparing the received voice command with the plurality of validated audio commands associated with the script commands, wherein the comparing step identifies at least one validated audio command from the plurality of validated audio commands based on the received voice command and wherein the comparing step is performed at the mobile device;

extracting at least one script command from the plurality of script commands based on the at least one validated audio command identified by the comparing step, wherein the extracting step is performed at the mobile device;

transmitting the at least one extracted script command and verification data from the mobile device to the remote computer wherein the remote computer:

uploads the transmitted script command upon verification that the mobile device is authorized to control the remote computer;

processes the uploaded script command in accordance with said predetermined operating system; and sends, to the mobile device, a visual or acoustic signal indicative of a status of processing the uploaded script command.

* * * * *